(12) United States Patent
Rodger et al.

(10) Patent No.: US 6,579,553 B1
(45) Date of Patent: Jun. 17, 2003

(54) FLAVORING MATERIALS FROM FILAMENTOUS FUNGI

(75) Inventors: Graham Wood Rodger, Stokesley (GB); Geoffrey Bryan Cordell, Billingham (GB); Donald Stewart Mottram, Reading (GB)

(73) Assignee: Zeneca Limited, London (GB)

( * ) Notice: Subject to any disclaimer, the term of this patent is extended or adjusted under 35 U.S.C. 154(b) by 0 days.

(21) Appl. No.: 09/582,133

(22) PCT Filed: Dec. 11, 1998

(86) PCT No.: PCT/GB98/03716

§ 371 (c)(1),
(2), (4) Date: Aug. 31, 2000

(87) PCT Pub. No.: WO99/30579

PCT Pub. Date: Jun. 24, 1999

(30) Foreign Application Priority Data

Dec. 16, 1997 (GB) .............................................. 9726452

(51) Int. Cl.$^7$ ................................................ H23L 2/56
(52) U.S. Cl. ..................... 426/533; 426/62; 426/535; 426/650
(58) Field of Search ................................. 426/533, 534, 426/535, 650, 61, 62

(56) References Cited

U.S. PATENT DOCUMENTS 5,114,734 A * 5/1992 Kibler et al. ............... 426/650
5,739,030 A 4/1998 Ward

FOREIGN PATENT DOCUMENTS

CH 556 647 12/1974
WO 95/23843 9/1995

OTHER PUBLICATIONS

Larousse Gastronomique: The World's Greatest Cookery Encyclopaedia, Mandarin Paperbacks London 1990, pps 837–839.

Rogers, Jo, "What Food Is That? and How Healthy Is It?", Lansdowne Publishing Pty Ltd, Sydney (1995), pp. 84–85.

Schindler F et al.: "In Proceedings of the International Conference on Biotechnology & Food," ((see FSTA (1991) 23 4B18)). Food Biotechnology, vol. 4, No. 1, 1990, pp. 75–85, XP002099422 NGF Biotechnology, Huls AG, Postfach 13 20, D–4370 Marl, Federal Republic of Germany see p. 83–85.

Database WPI Section Ch, Week 8011, Derwent Publications Ltd., London, GB; AN 80–19551C XP002098375 & JP 55 006350 B (IIZUKA C), Feb. 15, 1980.

Patent Abstracts of Japan, vol. 010, No. 362 (C–389), Dec. 4, 1986 & JP 61 158761 A (Ajinomoto Co Inc), Jul. 18, 1986.

Newmark P: "Meat substitutes. Fungal food." Nature, UK, vol. 287, No. 5777, 1980, p. 6 XP000647700.

* cited by examiner

*Primary Examiner*—Leslie Wong
(74) *Attorney, Agent, or Firm*—Pillsbury Winthrop LLP

(57) ABSTRACT

Flavoring materials may be produced from filamentous fungi by contacting them with water at a temperature sufficient to reduce their nucleic acid content and concentrating or separating solids from the resulting aqueous solution. The materials may be further subjected to a chemical reaction for example with a sulphur containing amino acid.

4 Claims, No Drawings

FLAVORING MATERIALS FROM FILAMENTOUS FUNGI

This application is the national phase of international application PCT/GB98/03716 filed Dec. 11, 1998 which designated the U.S.

It is known to use hydrolysed yeast extracts as flavouring materials. Yeast is non-toxic to humans and is normally cultured at high density (high dry cell weight per litre).

The nucleic acid content of filamentous fungi may be reduced by contacting them with water at high temperatures and separating them from the water, and such a process is described for Fusarium in PCT patent Application WO95/23843. We have discovered that the water from which the fungus is separated contains materials which can be used as or converted to flavouring materials for foods, especially if the fungus is Fusarium, for example Fusarium IMI 145,425.

The current invention comprises a method whereby the soluble components lost from filamentous fungal cells as a result of this heat treatment can be isolated and used as, or converted into, flavouring substances for foods.

This invention comprises a method of processing a filamentous fungus to improve its suitability as food which comprises subjecting it in the presence of water to a temperature sufficient to reduce its nucleic acid content substantially characterised by using materials removed from the fungus in the said method directly or after chemical reaction to flavour food.

The invention also comprises a flavouring material for food which is an aqueous solution which comprises nucleic acids removed from a filamentous fungus by contacting it with water at an elevated temperature in which the concentration of dissolved solids is sufficiently high to render the material stable to storage at a temperature of 20° C. for a period of one month or is a solid comprising such nucleic acids or is a flavouring material comprising a reaction product of such nucleic acids with a sulphur containing amino acid, hydrogen sulphide or ammonium sulphide.

The flavouring materials when in the form of an aqueous solution preferably comprises at least 30% by weight and more preferably 45 to 60% by weight of solids.

Whilst taste is an important factor in food flavours, the odours of flavouring materials are also important The soluble components are preferably concentrated from the aqueous solution arising from the nucleic acid reduction step by removing water for example by evaporation, distillation (preferably at reduced pressure) reverse osmosis, freeze drying or freezing out the water as ice leaving an aqueous concentrate. It may suitably be removed by evaporation at reduced pressure for example at a temperature of 40 to 70° C.

The dissolved solids may be separated as such or left as a concentrated solution where the Aw (water activity) is reduced sufficiently to ensure biostasis at a range of storage temperatures.

If the nucleic acid content of the filamentous fungus is reduced by raising the temperature of its growth medium the water recovered will contain salts and other nutrients, for example glucose and/or complex nitrogen nutrients in addition to the nucleic acids and other materials derived from the fungus. If the flavour imparted by such materials is required they may be left in the materials, but if not they may either be removed, for example by osmosis or ultrafiltration, or the fungus may be washed before its nucleic acid content is reduced thereby avoiding their presence. In WO95/23843 the removal of nucleic acid from a filamentous fungus in its growing state is described; such a process is an improvement over the treatment of fungus in its resting state, for example in pure water. We have found however that the organism takes a short time to adjust from its growing to its resting state and that providing the nucleic acids are removed soon after it is separated from its growth medium the nucleic acids may be satisfactorily removed according to the procedure of WO95/23843.

We have found that after partial or complete removal of water as aforesaid the concentrate can be used as an alternative to hydrolysed vegetable proteins, yeast autolysates or yeast extract as an additive for food. The materials removed from the fungus of value in the production of savoury flavouring preparations and process flavourings. Because of the savoury nature of the flavour it may be used directly in the flavouring of Snacks, Biscuits, Stocks, Soups, Stews, Sauces and Gravies at inclusion levels of preferably between 0.1 and 15 for example 1 to 10 dry weight %.

We have also found that on heating it produces an attractive roast-type aroma. If desired it may be partially hydrolysed before heating, for example by hydrolysis with acetic acid, to produce modified roast flavours.

It may also be reacted, optionally after at least partial hydrolysis, with sulphur containing amino acids, preferably cysteine or optionally with $H_2S$ and/or $(NH_4)_2S$ to produce savoury flavours.

The savoury nature of the material may be altered by chemical reaction to provide a different flavour profile in that the meaty/roasted flavour notes are increased. Such "reaction flavourings" may be used in flavouring Meat (beef, chicken, iamb, pork, etc), meat alternatives (e.g. based on soy, wheat, pea protein, myco-protein), prepared meals, snacks and drinks at incusion levels of preferably between 0.1 and 10 for example 1 to 8 dry weight %.

The flavourings may be produced by reacting materials removed from the fungus as aforesaid with cysteine. This may be carried out in the presence of water if desired; for example a 1.5 to 75 and preferably a 5 to 50 weight % solution of such materials may be reacted with cysteine in quantities of up to 10%, for example 1 to 5% of cysteine by weight based on such materials. The reaction may be carried out at a temperature of for example 110 to 140° C. at a pH of 5.5 to 9. Reaction is suitably continued for 0.5 to 7.5 hours.

It is believed that hydrolysis increases the free ribose content of the concentrate and this may be appropriate if certain flavours are desired. It is desirable to avoid treatment with hydrochloric acid for regulatory reasons (possible production of chloro-propanol derivatives), but hydrolysis with for example acetic acid may be desirable.

In the following descriptions the term "Centrate" is used for the extracellular liquid recovered by the heat shock treatment of a suspension of Fusarium at about 70° C. in the presence of its growth medium after separation of the cellular material. The term FDC means "freeze dried centrate".

EXPERIMENTAL PROCEDURES

Material Preparation

The liquid centrate was freeze dried in order to:

reduce the water content and therefore inhibit microbial growth;

carry out studies at a high concentration of centrate;

facilitate the handling of the product.

All further analyses described in this report deal with the freeze dried centrate abbreviated FDC.

Methods—Compositional Analyses

Moisture

The moisture content was determined by measuring the weight decrease of the FDC, until constant weight, while placed in an oven at 100° C.

Ash

The ash content was determined by placing the FDC in an oven at 600° C. until constant weight was obtained.

Organic Nitrogen

Kjeldahl nitrogen determination was carried out; sucrose was used as blank and glycine as standard. The results are shown in Table 1.

TABLE 1

Moisture, Ash and Organic Nitrogen Content of FDC

| | Replicates | | | |
|---|---|---|---|---|
| | 1 | 2 | 3 | Mean |
| Moisture (%) | 13 | 13 | 13 | 13 |
| Ash (%) | 18 | 18 | 17 | 18 |
| Organic Nitrogen (%) | 6 | 6 | 6 | 6 |

Amino Acids

The amino acids determination was done with a 6300 Beckman auto-analyser. The free amino acids present in the FDC were analysed using a 0.06% solution of the FDC. It was possible to measure the total amino acid content by a prior hydrolysis (HCl 6N, 24 h, oven 110° C.) of the FDC. However, the acid is known to hydrolyse tryptophan and the sulphur amino acids. The hydrolysis of the sulphur amino acids can be avoided by a prior oxidation of cysteine into cysteic acid, and methionine into methionine sulfone. This was carried out by treating the FDC with a solution of formic acid/hydrogen peroxide/methanol (48.5/1/0.5) during 4 h at 0° C. in the dark. The results are shown in Table 1a.

TABLE 1a

Amino Acid Content of FDC
mean results in g/100 g FDC

| Amino Acids | FDC (free AA) | Hydrolysed FDC (total AA) |
|---|---|---|
| CYSTEIC ACID | 0.09 | 0.32 |
| ASP | 0.14 | 0.50 |
| THR | 0.02 | 0.24 |
| SER | 0.12 | 0.16 |
| GLU | 2.02 | 1.70 |
| CYSTEINE | 0.00 | 0.21 |
| PRO | 0.00 | 0.20 |
| GLY | 0.05 | 0.24 |
| ALA | 2.05 | 1.73 |
| VAL | 0.14 | 0.37 |
| CYSTINE | 0.00 | 0.01 |
| METH | 0.00 | 0.13 |
| ILE | 0.00 | 0.21 |
| LEU | 0.00 | 0.30 |
| TYR | 0.00 | 0.06 |
| PHE | 0.00 | 0.17 |
| TRYPTOPHAN | 0.00 | 0.00 |
| NH3 | 1.49 | 4.56 |
| LYS | 0.15 | 0.26 |
| HIS | 0.00 | 0.08 |
| ARG | 0.71 | 0.65 |
| TOTAL | 6.98 | 11.80 |

Total Carbohydrates

The carbohydrate content of the FDC was assessed by the phenol-sulphuric acid assay method (Carbohydrate analysis: a practical approach, ed. Chaplin, Kennedy, IRL Press). Solutions of FDC and glucose (standard for calibration) were mixed with a solution of phenol in water (5% w/v). Concentrated sulphuric acid (1 ml) was added rapidly and directly to the solution surface without allowing it to touch the sides of the tube. The solutions were left undisturbed for 10 min before shaking vigorously. The absorbencies were read at 490 nm after a further 30 min.

Sugars

The sugar analysis was performed using a Dionex System of High Pressure Liquid Chromatography (HPLC), in which an eluent of HPLC grade water (1 ml/min) was used with an anion-exchange column (column Dionex PA-1) and a pulsed amperometric detector. Pure compounds were used as standards for retention time determination and quantitation. Free sugars were analysed using a 0.15% solution of FDC after filtering the solution through a 0.45 $\mu$m Minisart 25 membrane. Total sugars were also evaluated after a preliminary acid hydrolysis of the FDC (solution 0.15% in HCl 1N, 2 h, oven 110° C.) and filtration through first an Ag filter (precipitate of AgCl) and second a 0.45 $\mu$m Minisart 25 filter. The results are shown in Table 2.

TABLE 2

HPLC Analysis of Sugar Content of FDC
g sugar per 100 g of FDC

| | FDC mean | HYDROLYSED FDC mean |
|---|---|---|
| arabinose | 0.02 | 0.04 |
| galactose | 0.10 | 0.10 |
| glucose | 8.62 | 23.01 |
| sucrose | 0.09 | 0.23 |
| xylose | 0.00 | 0.00 |
| mannose | 0.00 | 0.10 |
| fructose | 0.01 | 0.00 |
| ribose | 0.00 | 0.06 |
| maltose | 2.08 | |
| TOTAL SUGARS | 12.66 | 25.10 |

Nucleic Acid Derivatives

A Perkin Elmer Binary HPLC pump 250 equipped with a Spectroflow 757 ABI Analytical Kratos Division was used. Standards and samples were filtered through Acrodisc 0.45 $\mu$m Gelman Sciences membranes filters and injected by means of an injector valve equipped with a 20 $\mu$l injection loop into a reverse-phase $\mu$Bondapack C18 (3.9×300 mm) Waters analytical column, protected by a $\mu$Bondapack C18 guard column. A wavelength of 254 nm was used. A gradient programme with two mobile phases was used: mobile solvent A was a 60/40 methanol/water mixture and mobile solvent B was 0.02M $KH_2PO_4$ (pH 5.5) prepared from potassium dihydrogen orthophosphate in distilled water and pH adjusted with IM KOH. All mobile solvents were filtered (Nylaflo 0.2 $\mu$m Gelman Sciences membranes filters) and degassed with Helium before use. The total run time was 51 min and the flow rate 1 m/min which consisted of 100% solvent B during 5 min, followed by a gradient from 0% to 36% solvent A in 36 min and 36% solvent A for 5 min. Then a reverse gradient of 36% to 0% A was set for 5 min and the HPLC was ready for further injection after 15 min equilibrium.

Identification of the compounds was made by comparison with the retention time obtained from standards analysed in the same HPLC conditions. Standards were analysed separately to know their individual retention time and then all together to check any elution over lap that may occur in the sample case. These standards are presented in Table 3.

TABLE 3

HPLC Retention Times of Nucleic Acid Standards

| Bases | Cytosine | | | Uracil | | | | Hypoxguanine | | | Xanthine |
|---|---|---|---|---|---|---|---|---|---|---|---|
| Ribonucleosides | | | | | | | | C | U | | |
| 2'Deoxy-ribonucleosides | | | | | | | | | | | |
| Ribonucleotides 3'MP | | | | CMP | | UMP | | GMP | | | |
| Ribonucleotides 5'MP | CMP | UMP | | | | GMP | IMP | | | | |
| 2'Deoxyribo-nucleotides 3'MP | | | | | | | | | | DGMP | |
| 2'Deoxyribo-nucleotides 5'MP | | | | | | | | | | | DIMP |
| Retention times | 3'73 | 4'29 | 4'69 | 5'20 | 5'62 | 6'32 + 6'32 | 6'70 | 7'52 | 9'79 + 9'79 + 9.79 + 9.79 | 10'74 | 11'49 + 11'49 |

| | Bases | | Purine | | Adenine | | | | | |
|---|---|---|---|---|---|---|---|---|---|---|
| | Ribonucleosides | | G | | I | | | | A | |
| | 2'Deoxy-ribonucleosides | | | | | | DG | DI | | DA |
| | Ribonucleotides 3'MP | | | | AMP | | | | | |
| | Ribonucleotides 5'MP | AMP | | | | | | | | |
| | 2'Deoxyribo-nucleotides 3'MP | | | | DAMP | | | | | |
| | 2'Deoxyribo-nucleotides 5'MP | DGMP | | | DAMP | | | | | |
| | Retention times | 13'33 + 13'33 | 17'36 | 21'05 | 21'56 | 22'58 + 22'58 + 22'58 | 23'99 | 26'08 | 32'90 | 35'81 |

Hydrolysis of FDC

Since free ribose is highly reactive in the Maillard reaction, the effect of gentle hydrolysis conditions on FDC and the subsequent effects on flavour generation were investigated. Acid hydrolysis was carried out with sodium acetate 0.01M, pH4 adjusted with acetic acid. Standards (inosine, adenosine 5'mono phosphate-AMP5', guanosine and guanosine 5'mono phosphate-GMP5') were prepared at 4000 μM in duplicate and an aliquot of each solution was taken and run under the same HPLC conditions as were adapted for the analysis of nucleic acids derivatives above. The solutions were then subjected to hydrolysis for 7.5 h in an oven 100° C. (GC oven Carlo Erba). The reaction was stopped by placing the tubes in an ice bath and kept in freezer until analysis.

FDC at 2% w/v was subjected to similar hydrolysis conditions.

Flavour Mixture Preparation

As indicated previously, FDC is considered to have the potential of being either a flavouring in its own right, or a precursor in the generation of reaction—product flavours. Therefore a range of reaction mixtures were prepared and are presented in Table 4.

TABLE 4

Flavoured mixtures analysed by sniffing panel

| Sample Name | Aqueous Centrate | Heated Aqueous Centrate | |
|---|---|---|---|
| Sample Composition | /1.7% (w/v, solids of centrate/water) | 1.7% (w/v, solids of centrate/water) 0.5 h 140° C. | |
| Sample Name | Heated Buffered (pH 5.5) Centrate | Heated Hydrolysed Buffered (pH 5.5 Centrate | Heated Hydrolysed Buffered (pH 5.5) Centrate + C |
| Sample Composition | 1.7% (w/v, solids of centrate/sodium acetate 0.01M) 0.5 h, 140° C. | 1.7% (w/v, solids of centrate/sodium acetate 0.01M) 7.5 h, 110° C. 0.5 h, 140° C. | 1.7% (w/v, solids of centrate/sodium acetate 0.01M) 1 g cysteine/17 g solids of centrate 7.5 h, 110° C. 0.5 h, 140° C. |
| Sample Name Sample Composition | Heated Aqueous Centrate 12% pH 5.5 | Heated Aqueous Centrate 20% pH 5.5 | Heated Aqueous Centrate 30% pH 5.5 |
| | 12% (w/v, solids of centrate/water) 0.5 h, 140° C. | 20% (w/v solids of centrate/water) 0.5 h, 140° C. | 30% (w/v, solids of centrate/water) 0.5 h, 140° C. |

TABLE 4-continued

Flavoured mixtures analysed by sniffing panel

| Sample Name / Composition | | | |
|---|---|---|---|
| Sample Name | Heated Aqueous Centrate 50% pH 5.5 | Heated Aqueous Centrate 75% pH 5.5 | Heated Aqueous Centrate 87% pH 5.5 |
| Sample Composition | 50% (w/v, solids of centrate/water) 0.5 h, 140° C. | 75% (w/v, solids of centrate/water) 0.5, 140° C. | 87% (w/v, solids of centrate/water) 0.5 h, 140° C. |
| Sample Name | Heated Aqueous Centrate 20% pH 7.5 | Heated Aqueous Centrate 30% pH 7.5 | |
| Sample Composition | 20% (w/v, solids of centrate/water) 0.5 h, 140° C. | 30% (w/v, solids of centrate/water) 0.5 h, 140° C. | |
| Sample Name | Heated Aqueous Centrate 20% pH 9 | Heated Aqueous Centrate 30% pH 9 | |
| Sample Composition | 20% (w/v, solids of centrate/water) 0.5 h, 140° C. | 30% (w/v, solids of centrate/water) 0.5 h, 140° C. | |
| Sample Name | Heated Aqueous Centrate pH 5.5 + C 1/20 | Heated Aqueous Centrate pH 5.5 + C 1/10 | Heated Aqueous Centrate pH 5.5 + C 1/5 |
| Sample Composition | 20% (w/v, solids of centrate/water) 1 g cysteine/20 g solids of centrate 0.5 h, 140° C. | 20% (w/v, solids of centrate/water) 1 g cysteine/10 g solids of centrate 0.5 h, 140° C. | 20% (w/v, solids of centrate/water) 1 g cysteine/5 g solids of centrate 0.5 h, 140° C. |
| Sample Name | Heated Aqueous Centrate pH 9 + C 1/20 | Heated Aqueous Centrate pH 9 + C 1/10 | Heated Aqueous Centrate pH 9 + C 1/5 |
| Sample Composition | 20% (w/v, solids of centrate/water) 1 g cysteine/20 g solids of centrate 0.5 h, 140° C. | 20% (w/v, solids of centrate/water) 1 g cysteine/10 g solids of centrate 0.5 h, 140° C. | 20% (w/v, solids of centrate/water) 1 g cysteine/5 g solids of centrate 0.5 h, 140° C. |
| Sample Name | 175° C. Heated Aqueous Centrate pH 5.5 + C 1/20 | 100° C. 1 h Heated Aqueous Centrate pH 5.5 + C 1/20 | 100° C. 1.5 h Heated Aqueous Centrate pH 5.5 + C 1/20 |
| Sample Composition | 20% (w/v, solids of centrate/water) 1 g cysteine/20 g solids of centrate 5 min, 175° C. | 20% (w/v, solids of centrate/water) 1 g cysteine/20 g solids of centrate 1 h, 100° C. | 20% (w/v, solids of centrate/water) 1 g cysteine/20 g solids of centrate 1.5 h, 100° C. |
| Sample Name | 175° C. Heated Aqueous Centrate pH 9 + C 1/5 | 100° C. 1 h Heated Aqueous Centrate pH 9 + C 1/5 | 100° C. 1.5 h Heated Aqueous Centrate pH 9 + C 1/5 |
| Sample Composition | 20% (w/v, solids of centrate/water) 1 g cysteine/5 g solids of centrate 5 min, 175° C. | 20% (w/v, solids of centrate/water) 1 g cysteine/5 g solids of centrate 1 h, 100° C. | 20% (w/v, solids of centrate/water) 1 g cysteine/5 g solids of centrate 1.5 h, 100° C. |

Selected mixtures for GS-MS analysis are underlined
C = Cysteine

Reaction mixtures (2 ml) were prepared by mixing appropriate quantities of stock solutions in glass tubes and then transferring to 20 ml Kimble ampules that were sealed in hot flame. The ampules were then placed in a metal cover and heated in a Carlo Erba 4200 gas chromatograph oven.

The reaction mixtures were stored in the freezer at −20° C. before analysis. The ampules were broken for analysis after bringing the reaction mixtures to room temperature.

Sensory Evaluation of Aroma Volatiles

An informal panel of 6 persons (3 females, 3 males) experienced in flavour evaluation was recruited.

For sensory evaluation, 1 ml aliquots of the samples under investigation were transferred into brown screw-cap bottles and diluted 10 times (except for the concentration study where no dilution was applied). The coded samples were presented to one panellist at one time at room temperature and the panellists were asked to describe the aromas using their own terms.

Instrumental Evaluation of Aroma Volatiles Determination

A dynamic headspace collection procedure was used. Each sample (1.7 ml of reaction mixture so that it was equivalent to 0.4 g of FDC) was placed in a 250 ml conical flask fitted with a Drechsel head. Distilled water was added to a final volume of 10 ml and the mixture shaken gently. Oxygen-free nitrogen was passed over the sample for 1 h at a rate of 40 m/min. The volatiles were swept onto a preconditioned glass-lined stainless-steel trap (105 mm×3 mm i.d.) packed with 85 mg Tenax GC (CHIS system. SGE Limited). Throughout the collection, the sample was maintained at 37° C. using a water bath. The internal standard was 1,2-dichlorobenzene in ether (130 μl/ml) and 1 μl was injected onto the trap at the end of the collection time, the trap was then flushed with nitrogen for 10 min.

A Hewlett-Packard (HP) 5890/5972 gas chromatograph-mass spectrometer (GC-MS), fitted with a 50 m×0.32 mm i.d. fused-silica capillary column coated with BPX-5) SGE Limited) at 0.5 μm film thickness, was used to analyse the collected volatiles. These were thermally desorbed at 250° C. in the CHIS injection port (SGE Limited) and cryofocused directly onto the front of the GC column, while the oven was held at 0° C. for 5 min. The oven temperature was then raised to 40° C. over 1 min and held for 5 min before raising the temperature to 250° C. at a rate of 4° C./min and holding for a further 10 min. The helium carrier gas flow rate was 1.5 ml/min. Mass spectra were recorded in the electron impact mode at an ionisation voltage of 70 eV and source temperature of 200° C. A scan range of 29–400 m/z and a scan time of 0.69 s were used. The date were controlled and stored by the HP G1034C Chemstation data system.

Volatiles were identified by comparison of their mass spectra with the spectra from authentic compounds in the Reading Laboratory or in the NIST/EPA/MSDC Mass Spectral Database or other published spectra. The linear retention index (LRI) was calculated for each component using the retention times of a homologous series of $C_6$–$C_{22}$ n-alkanes.

Nucleic Acid Derivatives

The nucleic acid composition of the centrate was determined from 3 replicates and is presented in Table 5. It explains most of the HPLC eluted peaks. A number of compounds co-eluted, but it was not possible to investigate alternative analysis conditions and, therefore, for co-eluting compounds it was not possible to determine which of the compounds contributed to the peak obtained in the centrate analysis.

As expected, there were few deoxyribonucleic acid derived compounds compared with the ribonucleic acid derived compounds, which are more abundant in nature. The major nucleic acid components are cytosine 5' monophosphate (26% of the total nucleic acid content), uridine 3' monophosphate and/or guanosine 5' monophosphate (18%), adenosine 5' monophosphate and/or deoxyribo guanosine 5' monophosphate (16%). All of them are potential sources of ribose and ribose phosphate which are good reactive precursors the Maillard reaction. Excluding the bases, the potential source of ribose or ribose phosphate represents 96% of the nucleic acid content of the centrate, which is Iequivalent to 202 ppm of the content of the centrate.

were hydrolysed by half or less, producing their respective nucleosides which were further hydrolysed into their bases. Although it is possible to hydrolyse the ribonucleotides into their bases and consequently produce ribose and/or ribose phosphate, relatively low yields of bases were obtained and an optimisation of this process should be carried out.

TABLE 6

Acid hydrolysis results of model systems

| | Quantity (%) initial | After hydrolysis | | | total |
|---|---|---|---|---|---|
| | | hypoxanthine | inosine | IMP5' | |
| inosine | 100 | 13 | 85 | | 98 |
| IMP5' | 100 | 6 | 15 | 71 | 92 |
| | | guanine | guanosine | GMP5' | |
| guanosine | 100 | 2 | 42 | | 44 |
| GMP5' | 100 | 2 | 35 | 51 | 88 |

TABLE 5

Centrate Nucleic Acids HPLC Analysis Results

| Nucleic Acid Type | CMP'5 | UMP5' | Uracil' | UMP3' + GMP5' | IMP5' | Cytidine | Hypox + guanine + uridine + GMP3' |
|---|---|---|---|---|---|---|---|
| nucleic acid (ppm in centrate | 54 | 23 | 1 | 38 | 5 | 5 | 7 |
| nucleic acid (% of total) | 26 | 11 | 0 | 18 | 3 | 2 | 3 |
| Standard deviation (ppm in centrate) | 3 | 1 | 0 | 1 | 0 | 1 | 0 |

| Nucleic Acid Type | AMP5' + I + DAMP3' + DAMP5' | Purine | AMP5' + I + DAMP3' + DAMP5' | DG | DI | Adenosine | Total |
|---|---|---|---|---|---|---|---|
| nucleic acid (ppm in centrate | 34 | 2 | 6 | 2 | 15 | 19 | 212 |
| nucleic acid (% of total) | 16 | 1 | 3 | 1 | 7 | 9 | 100 |
| Standard deviation (ppm in centrate) | 2 | 0 | 0 | 0 | 1 | 2 | | hypox = hypoxanthine
I = inosine
C = cytidine
U = Uridine
G = Guanosine
A = Adenosine
MO = mono phosphate
D = deoxyribose Effects of Acid Hydrolysis on Nucleic Acid Derivatives Table 6 presents the results of hydrolysis of solutions of inosine, guanosine and their respective 5' phosphate ribonucleotides. The method is based on that used by Matoba et al (J. Food Science, vol. 53, n.4, 1988, p1156). The last column gives an indication of quantity recovery and it can be seen that the results of the hydrolysis on the guanosine showed a significant loss, which suggests that the guanine molecule is unstable.

The most interesting model systems are the ribonucleotides since they are major components in the centrate. They Conclusion The nucleic acid composition of the FDC has been characterised. It comprises mainly ribonucleotides with relatively small amounts of deoxyribonucleotides. Hydrolysis of nucteotides releases free ribose or ribose phosphate only occurs to a relatively small extent in acetate buffer at pH 4.

Results—Sensory Evaluations of Aroma Volatiles

It was decided to present the individual results of each panellist and not to group them under specific common descriptors because of the too large diversity of the terms described.

Tables 7 and 8 present the effect of heating and the impact of the hydrolysis, with or without the addition of cysteine.

TABLE 7

Aroma panel results on centrate - Study of the effect of cooking

| Sample name | Aqueous Centrate | Heated Aqueous Centrate |
| --- | --- | --- |
| Sample Composition | 1.7% (w/v, solids of centrate/water) | 1/7% (w/v, solids of centrate/water) 0.5, 140° C. |
| Panellist 1 | scrumpy, glucose, syrup, molasses | molasses, caramel |
| Panellist 2 | caramel, sweet | |
| Panellist 3 | whey, old yoghurt, sham, creamy | burnt raw celery, braised celery, weird smell |
| Panellist 4 | wet cloth/ironing/scorching auto-claving media, slightly acrid | fermenting cereal, ironing/wet cloth, cotton/wool, treacle, golden syrup |
| Panellist 5 | honey, urine | caramel, fatty |
| Panellist 6 | caramel, slightly fruity | slightly fruity caramel, burnt, sharp |

TABLE 8

Aroma panel results on heated buffered centrate - Study of the effect of hydrolysis and of addition of cysteine

| Sample | Heated Buffered (pH 5.5) Centrate | Heated Hydrolysed Buffered (pH 5.5) Centrate | Heated Hydrolysed Buffered (pH 5.5) Centrate + Cysteine |
| --- | --- | --- | --- |
| Sample Composition | 1.7% (w/v solids of centrate/sodium acetate 0.01M) | 1.7% (w/v, solids of centrate/sodium acetate 0.01M) | 1.7% (w/v, solids of centrate/sodium acetate 0.01M) |
| | 0.5 h, 140° C. | 7.5 h, 110° C. | 1 g cysteine/17 g solids of centrate |
| | | 0.5 h, 140° C. | 7.5 h, 110° C. 0.5 h, 140° C. |
| Panellist 1 | burnt, caramel, toffee, acrid, acid | resinous, burnt, acrid | burning paper/plastic/hair, putrid, acrid |
| Panellist 2 | burnt, caramel, celery, slightly sweet | stale shall, burnt, acidic | burnt, celery, acid |
| Panellist 3 | braised celery, marmite, jammy, cooked apple | varnish, paint, biscuit | sweet, grassy, herbal, raw onion, vinegar |
| Panellist 4 | rotting vegetable, sulfur, autoclaving malted barley, burnt, nutty, treacle | wet cloth, autoclaving, fermenting cereal, nose catching/sharp | onion rotting, hard boiled egg, malty/barley/fermenting cereal |
| Panellist 5 | treacle, honey, fatty | nicotine | burning tyres |
| Panellist 6 | caramel, toffee, slight fruity, slightly burnt | chemical, slightly burnt rubbery | caramel, toffee, sweet, floral |

The study of the effect of concentration of centrate involved the range of concentrations likely to be reached in commercial practice, i.e., within the range 12% and 30% of solids. These were compared with the non diluted freeze dried centrate powder (87% solids). The other preparation conditions were kept constant. viz. pH 5.5 and heating at 140° C. for 30 min. The results are presented in Table 9. The odours were very strong and the reproducibility of the results within 2 replicates for each panellist was fairly poor. However, there was a noticeable trend within the sample set from low to high concentration: at 12%, the odours were mainly sweet, vegetable and molasses. These notes became associated with burnt and sharp as well as savoury at 20 and 30% solids. At 50%, the sample had roasted and paint smells that became dominant at 75%. Some extra metallic, burnt rubbery, and sulphur notes were detected with the 87% sample. The 20 and 30% solid samples seemed the most interesting because of their meaty savour smells and therefore they were selected for further analysis, it was also decided to dilute the original flavoured reaction mixtures before sniffing further reaction mixtures.

TABLE 9

Aroma panel results on heated centrate pH 5.5 - Study of the effect of concentration

| Sample Name | Heated Aqueous Centrate 12% pH 5.5 | Heated Aqueous Centrate 20% pH 5.5 | Heated Aqueous Centrate 30% pH 5.5 |
| --- | --- | --- | --- |
| Sample Composition | 12% (w/v, solids of centrate/water) 0.5 h, 140° C. | 20% (w/v, solids of centrate/water) 0.5 h, 140° C. | 30% (w/v, solids of centrate/water) 0.5 h, 140° C. |
| Panellist 1 | burnt, caramel, slightly sweet | sweet, slightly meaty, nutty | soja sauce, caramel, toffee, burnt, sweet |
| Panellist 2 | sickly molasses | sharp, acrid, cloying, burnt paper | molasses, black treacle |
| Panellist 3 | celery, burnt roast coffee, bovril | marmite | marmite, emulsion paint |
| Panellist 4 | honey, caramel, stir fry | honey, caramel, stir fry, vegetable | caramelised vegetables |
| Panellist 5 | celery, rancid, maggi, bovril | sharp, marmite, yeasty, bovril + celery undertones | sharp, bovril, vinegary top note |
| Panellist 6 | malty, brewery, virol (malt extract), v. concentrate digestive biscuit, black treacle, autoclaving | honey, malty | autoclaving, honey, digestive biscuits |

TABLE 9-continued

Aroma panel results on heated centrate pH 5.5 - Study of the effect of concentration

|  | REPLICATE | REPLICATE | REPLICATE |
|---|---|---|---|
| Panellist 1 | sweet, caramel, soja sauce | burnt, toffee, acrid | soja sauce, caramel, burnt, sweet |
| Panellist 2 | burnt, caramel, burnt skin/hair | sharp, acrid, cloying, burnt paper | molasses, resinous |
| Panellist 3 | malt | marmite, celery | marmite, celery, slight roast coffee |
| Panellist 4 | honey, caramel, stir fry | honey, earthy, uncooked potato | soy sauce, wood smoke |
| Panellist 5 | celery, meaty | burnt celery | bovril, strange top note |
| Panellist 6 | black treacle, virol, autoclaving | concentrated honey, biscuity digestives, autoclaving | biscuits, honey, green/fruity, green bananas |
| Sample Name | Heated Aqueous Centrate 50% pH 5.5 | Heated Aqueous Centrate 7.5% pH 5.5 | Heated Aqueous Centrate 87% pH 5.5 |
| Sample | 50% (w/v, solids of centrate/water) | 75% (w/v, solids of centrate/water) | 87% (w/v, solids of centrate/water) |
| Composition | 0.5 h, 140° C. | 0.5 h, 140° C. | 0.5 h, 140° C. |
| Panellist 1 | burnt, caramel, bitter chocolate | burnt, very strong, chocolate | burnt sugar |
| Panellist 2 | molasses, black treacle, solvent | burnt, solvent, sickly | savoury, burnt, burnt flesh/skin |
| Panellist 3 | paint, marmite, slight celery | burnt | slightly sweet, burnt, marmite |
| Panellist 4 | raw vegetables, caramel | caramel, roasted slight treacle | soy sauce |
| Panellist 5 | strange top note of sharp green/fruity note/household or dry smell | very burnt sugar + top note | burnt rubber, sulphur, very burnt sugar |
| Panellist 6 | green banana, honey, slight autoclaving, slight virol | burnt milk, burnt sugar (not caramel - really burnt) | dry, dusty sensation, like something burnt black in oven, sharp, faint marmite, black treacle, slightly stale, metallic, rusty steel |
|  | REPLICATE | REPLICATE | REPLICATE |
| Panellist 1 | burnt, caramel | burnt, slightly sweet, caramel | burnt sugar |
| Panellist 2 | burnt, black treacle, slight acrid | very strong marmite, meat extract, burnt, caramel | molasses, burnt, savoury |
| Panellist 3 | paint, marmite, cereal | marmite, burnt | burnt, marmite |
| Panellist 4 | vegetable, roasted, woodland | damp wood, syrup, honey | vegetable |
| Panellist 5 | strong strange top note, bovril | strong strange top note, burnt sugar | marmite, yeasty, bovril, very concentrated |
| Panellist 6 | black treacle, acrid/burnt honey, virol/malt | fresh sensation, honey, malt | same as other replicate |

The pH effect was studied on the centrate at 3 different values: 5.5, 7.5 and 9, with the heating conditions kept at 140° C. for 30 min. The results are in Table 10. There was not much difference in the results between the 20% and the 30% solids samples. The results at pH 7.5 were similar to those at pH 5.5 and the smells were mainly autoclave and caramel. The odour became burnt with pH 9. Therefore it was decided to carry on the sniffing experiments by selecting the two extreme pHs and to keep only one concentration (20% solids)

TABLE 10

Aroma panel results on heated centrate study of the effect of pH

| Sample Name | Heated aqueous centrate 20% pH 5.5 | Heated aqueous centrate 30% pH 5.5 |
|---|---|---|
| Sample composition | 20% (w/v, solids of centrate/water) 0.5 h 140° C. | 30% (w/v, solids of centrate/water) 0.5 h 140° C. |
| Dilution before sniffing | 50 for panellist 1<br>10 for panellist 2 | 50 for panellist 1<br>10 for panellist 2 |
| Panellist 1 | 1-slight autoclaving 2-diacetyl then going to caramel, butter scotch, slightly nutty | 1-slightly autoclave, "catching" in nose. 2-then quite a lot of caramel |
| panellist 2 | caramel, butter-like | caramel, sweet |
| Sample name | Heated aqueous centrate 20% pH 7.5 | Heated aqueous centrate 30% pH 7.5 |
| Sample composition | 20% (w/v, solids of centrate/water 0.5 h 140° C. | 30% (w/v, solids of centrate/water) 0.5 h 140° C. |

TABLE 10-continued

Aroma panel results on heated centrate study of the effect of pH

| Dilution before sniffing | 50 | 50 |
|---|---|---|
| Panellist 1 | similar to sample 20% pH 5.5 in the way it changes, bit more autoclaving, caramel but not really butterscotch | 1-slightly autoclave 2-caramel |
| Sample name | Heated aqueous centrate 20% pH 9 | Heated aqueous centrate 30% pH 9 |
| Sample composition | 20% (w/v, solids of centrate/water) 0.5 h 140° C. | 30% (w/v, solids of centrate/water) 0.5 h 140° C. |
| Dilution before sniffing | 10 | 10 |
| Panellist 2 | burnt, baked, roasted, cereals | slightly burnt, caramel sweet |

The effect of addition of cysteine was studied on the centrate in solution at 20% solids at pH 5.5 and 9. There were three concentrations of cysteine tested: ratios 1/20, 1/10 and 1/5 of cysteine (g)/centrate solids (g). The heating conditions were kept the same as previously (104° C. for 30 min). The results are presented in Table 11. Within the pH 5.5 sample series, the low concentration of cysteine sample lead to a somewhat pleasant odour of sweet, greasy, meaty sauce, that was progressively replaced by roasted and rubber notes as the cysteine concentration increased. At pH 9, the burnt roasted cereals notes already mentioned in the previous experiment were present again with cysteine at low concentration. When the cysteine content increased, the odour became strong and more nutty and then close to savoury, meaty stock. It was therefore decided to select pH 5.5 with cysteine 1/20 sample and pH9 with cysteine 1/5 sample for the next set of experiments.

TABLE 11

Aroma panel results on heated centrate pH 5.5 and pH 9 - Study of the effect of addition of cysteine

| Sample Name | Heated Aqueous Centrate pH 5.5 + cysteine 1/20 | Heated Aqueous Centrate pH 5.5 + cysteine 1/10 | Heated Aqueous Centrate pH 5.5 + cysteine 1/5 |
|---|---|---|---|
| Sample Composition | 20% (w/v, solids of centrate/water) 1 g cysteine/20 g solids of centrate | 20% (w/v, solids of centrate/water) 1 g cysteine/10 g solids of centrate | 20% (w/v, solids of centrate/water) 1 g cysteine/5 g solids of centrate |
| Dilution before Sniffing | 0.5 h, 140° C. 10 | 0.5 h, 140° C. 10 | 0.5 h, 140° C. 10 |
| Panellist 1 | celery, cooked vegetables, burnt wool, sweaty socks | bacon fat, crispy duck (chinese style, sl. sweaty, roasted | sweet, caramel, roasted |
| Panellist 2 | celery (strong), sl. burnt coffee, treacle toffee (sl.) | puffed wheat, sweet + sour | celery, sweet + sour, puffed wheat (strong) |
| Panellist 3 | strong chicken stock, greasy, acidic, rubber | burning rubber, savoury, marmite, malt extract | weak rubbery, acrid |
| Panellist 4 | strong celery (main odour) + other notes - meaty, pork and apple, sweet and sour sauces | medicinal smell, also watery stock (weak) faint celery/sweet'n sour | (sweet and sour), rubber, magi |
| Panellist 5 | black treacle, buttery/caramel, burnt sugar, burnt fried boiled cabbage, marsala, sweet, nutty | buttery, golden syrup, something burnt? (wet wood or toasted nuts, almond, hazelnut) | golden syrup, caramel, toasted nuts (not burnt) sl. sulphur. |
| Sample Name | Heated Aqueous Centrate pH 9 + cysteine 1/20 | Heated Aqueous Centrate pH 9 + cysteine 1/10 | Heated Aqueous Centrate pH 9 + cysteine 1/5 |
| Sample Composition | 20% (w.v, solids of centrate/water) 1 g cysteine/20 g solids of centrate | 20% (w/v, solids of centrate/water) 1 g cysteine/10 g solids of centrate | 20% (w/v, solids of centrate/water) 1 g cysteine/5 g solids of centrate |
| Dilution before Sniffing | 0.5 h, 140° C. 10 | 0.5 h, 140° C. 10 | 0.5 h, 140° C. 10 |
| Panellist 1 | burnt, roasted, nutty | sweet caramel, roasted, nutty, burnt | meaty, pork crackling, nutty |
| Panellist 2 | sweet (strong), toffee, biscuity, marzipan | celery (strong), sl. sweet, biscuity | meaty (strong) |
| Panellist 3 | savoury, burnt skin, stock | burning rubber, strong savoury, malt extract | strong chicken stock, chicken fat, sl. acrid |
| Panellist 4 | v. strong weird note, stale biscuit crumbs, Farleys rusks, faint sweet'n sour note | fruity, sweet, burnt sugar, vinegar | sulphury, weak stock, nasty note, burnt meat? |
| Panellist 5 | burnt, scorched/burnt wet wool, golden syrup | same as sample 1/20 but stronger burnt, less golden syrup | meaty (beef gravy?), burnt, burnt sugar, plus caramel |

The results of the temperature/duration heating conditions study are presented in Table 12. They involve the two selected samples previously described which were then cooked at a lower temperature and longer time: 100° C. for 60 min and 90 min, and at a higher temperature but for a shorter time: 175° C. for 5 min. Compared to the original heating conditions, similar results were obtained for the pH 5.5 cysteine 1/20 sample by heating 100° C. for 60 min. Longer time of heating at 100° C. resulted in more roasted burnt notes and a similar type of odour was obtained after 5 min at 175° C. Regarding the pH 9 cysteine 1/5 sample, the meaty notes obtained by 30 min at 140° C. were reached by the treatment 5 min at 175° C. At 100° C., some very strong odours of urine and boiled eggs were described.

TABLE 12

Aroma panel results on heated centrate pH 5.5 and pH 9 + Cysteine
Study of the effect of temperature and duration of the cooking

| Sample Name | 175° C. Heated Aqueous Centrate pH 5.5 + cysteine 1/20 | 100° C. 1 h Heated Aqueous Centrate pH 5.5 + cysteine 1/20 | 100° C. 1.5 h Heated Aqueous Centrate pH 5.5 + cysteine 1/20 |
|---|---|---|---|
| Sample Composition | 20% (w/v, solids of centrate/water) 1 g cysteine/20 g solids of centrate) | 20% (w/v, solids of centrate/water) 1 g cysteine/20 g solids of centrate | 20% (w/v, solids of centrate/water) 1 g cysteine/20 g solids of centrate |
| Dilution before sniffing | 5 min 175° C. 10 | 1 h, 100° C. 10 | 1.5 h, 100° C. 10 |
| Panellist 1 | burnt-strong, caramel-moderate, roasted-moderate | fruity-moderate, nutty-slight | celery-moderate, roasted-light |

TABLE 12-continued

Aroma panel results on heated centrate pH 5.5 and pH 9 + Cysteine
Study of the effect of temperature and duration of the cooking

| | | | |
|---|---|---|---|
| Panellist 2 | puffed wheat-strong, marmite-medium, celery-light | celery-strong | celery-medium, cereal-slight |
| Panellist 3 | rancid-v. strong, acrid-strong, burnt fat/skin-medium, molasses-medium/weak | chicken fat-medium, rubber-medium, burnt rubber-medium | burnt rubber-weak, molasses-weak medium, burnt/cold wood-weak |

| Sample Name | 175° C. Heated Aqueous Centrate pH 9 + cysteine 1/5 | 100° C. 1 h Heated Aqueous Centrate pH 9 + cysteine 1/5 | 100° C. 1.5 h Heated Aqueous Centrate pH 9 + cysteine 1/5 |
|---|---|---|---|
| Sample Composition | 20% (w/v, solids of centrate/water) 1 g cysteine/5 g solids of centrate | 20% (w/v, solids of centrate/water) 1 g cysteine/5 g solids of centrate | 20% (w/v, solids of centrate/water) 1 g cysteine/5 g solids of centrate |
| | 5 min, 175° C. | 1 h, 100° C. | 1.5 h, 100° C. |
| Dilution before sniffing | 10 | 10 | 10 |
| Panellist 1 | crackers-moderate, stale-slight, baked bread-moderate | yeast extract-weak, vegetables-moderate, wet washing-moderate | yeast, bread dough-moderate, vegetables-weak, nutty background after other odours decrease |
| Panellist 2 | sulphury-slight, meaty-medium, burnt-medium | hard boiled egg-strong | egg-strong |
| Panellist 3 | burnt paper-weak, chicken stock-weak/medium cereal/malty-weak | wet wall paper-medium, urine | state, wet wallpaper, musty |

Results—Instrumental Analysis CF Aroma Volatiles by GC/MS

A selection of the reaction mixtures described above were further studied by GC-MS analysis of the headspace volatiles by the method described previously. These mixtures are underlined in Table 2. A sample of autolysed yeast was analysed under the same conditions for comparison of the volatiles. The results of the study are presented in detail in Table 13.

TABLE 13

Volatile compounds analysed by headspace concentration

Approximate quantities (ng/0.4 g of Freeze Dried Centrate, or ng/45.7 g of Centrate)

| Identified Compounds | LRI | pH 5.5 140° C. | ph 9 140° C. | pH 5.5 + C 1/20 140° C. | pH 5.5 + C 1/5 140° C. | ph 9 + C 1/20 140° C. | pH 9 + C 1/5 140° C. | pH5.5 + C 1/20 175° C. | pH 9 + C 1/5 175° C. | pH 5.5 + C 1/20 100° C. | pH 5.9 + C 1/5 100° C. | Yeast |
|---|---|---|---|---|---|---|---|---|---|---|---|---|
| Pyrazines | | | | | | | | | | | | |
| pyrazine | 762 | — | 648 | — | — | 1108 | — | — | — | — | — | — |
| methylpyrazine | 845 | 78 | 4607 | — | 37 | 2521 | 813 | 102 | 132 | — | — | — |
| 2-6-dimethylpyrazine | 928 | — | — | — | — | 465 | 590 | — | — | — | 3 | — |
| 2,5-dimethylpyrazine | 936 | 104 | 3859 | — | — | 382 | 500 | — | — | — | 17 | 4 |
| 2,3-methylpyrazine | 940 | — | 966 | — | — | 30 | — | — | 157 | — | — | — |
| ethenylpyrazine | 950 | 44 | 239 | — | — | — | — | — | — | — | — | — |
| 2-ethylpyrazine | 956 | — | 38 | — | — | 118 | 186 | — | 167 | — | — | — |
| 2-ethyl-6-methylpyrazine | 1014 | — | 984 | — | — | 301 | 343 | — | — | — | — | — |
| trimethylpyrazine | 1018 | 256 | 1758 | — | 63 | 1453 | 1758 | — | 518 | — | 98 | — |
| propylpyrazine | 1025 | — | 21 | — | — | — | — | — | — | — | — | — |
| 6-methyl-2-ethenylpyrazine | 1034 | 20 | 160 | — | — | — | — | — | — | — | — | — |
| tetramethylpyrazine | 1098 | — | — | — | 46 | 1009 | 1121 | — | 660 | — | 647 | — |
| dimethylethylpyrazine | 1099 | 416 | 120 | 51 | — | 85 | 111 | 74 | — | — | 9 | — |
| dimethylethylpyrazine | 1101 | — | 1593 | — | — | — | 35 | — | — | — | — | — |
| methylpropylpyrazine | 1101 | 26 | — | — | — | — | — | — | — | — | — | — |
| 3,5-diethyl-2-methylpyrazine | 1168 | — | 137 | — | — | — | — | 18 | — | — | — | 4 |
| trimethylethylpyrazine | 1168 | 51 | — | — | — | 120 | 195 | — | 75 | — | 105 | — |
| dimethylpropylpyrazine | 1170 | 12 | 63 | — | — | 98 | 186 | — | 51 | — | 15 | — |
| dimethylpropylpyrazine | 1179 | 32 | 130 | — | — | 61 | 146 | — | 40 | — | 9 | — |
| dimethylbutylpyrazine | 1321 | — | — | — | — | — | — | — | — | — | 16 | 2 |
| trimethylpropylpyrazine | 1247 | 75 | 168 | — | 23 | 166 | 352 | 36 | 150 | — | 265 | — |
| trimethylpropylpyrazine | 1260 | 16 | 99 | — | — | 27 | — | — | — | — | — | — |
| 2-(2-methylpropyl)-3-(1-methylethyl)-pyrazine | | — | — | — | — | — | — | — | — | — | 2 | — |
| methyldiethylpyrazine | | | | | | | | | | | 7 | |
| 2,5-diemthyl-3,6-dipropyl-pyrazine | | — | — | — | — | — | — | — | — | 5 | — | — |
| Furans | | | | | | | | | | | | |
| 2-ethylfuran | 707 | — | — | 29 | 398 | 32 | 2037 | — | — | — | — | — |
| dimethylfuran | 711 | — | — | — | 22 | — | — | 112 | — | — | — | — |
| 2,4-dimethylfuran | 723 | 111 | — | 104 | 111 | 43 | 85 | — | — | — | — | — |

TABLE 13-continued

Volatile compounds analysed by headspace concentration

Approximate quantities (ng/0.4 g of Freeze Dried Centrate, or ng/45.7 g of Centrate)

| Identified Compounds | LRI | pH 5.5 140° C. | ph 9 140° C. | pH 5.5 + C 1/20 140° C. | pH 5.5 + C 1/5 140' C. | ph 9 + C 1/20 140° C. | pH 9 + C 1/5 140° C. | pH5.5 + C 1/20 175° C. | pH 9 + C 1/5 175° C. | pH 5.5 + C 1/20 100° C. | pH 5.9 + C 1/5 100° C. | Yeast |
|---|---|---|---|---|---|---|---|---|---|---|---|---|
| dihydro-2methyl-3(2H)-furanone | 831 | 71 | 69 | — | — | — | — | — | — | — | — | — |
| 2-furancarboxaldehyde | 857 | 668 | — | 253 | 109 | — | — | 165 | — | — | — | — |
| 2-furanmethanol | 881 | 85 | 298 | 153 | 85 | 33 | — | 121 | 11 | — | — | 7 |
| 2-furanmethanethiol | 926 | — | — | — | 249 | — | — | — | — | — | — | — |
| 2-acetylfuran | 924 | — | — | — | — | — | — | — | 406 | — | — | — |
| 1-(2-furanyl)-ethanone | 929 | 84 | — | 629 | 1193 | — | 391 | 494 | — | — | 7 | — |
| 2-pentylfuran | 997 | 113 | 62 | ? | — | 35 | 47 | — | — | — | — | — |
| 1-(2-furanyl)-1-propanone | 1025 | 21 | — | — | — | — | — | — | — | — | — | — |
| Pyrans | | | | | | | | | | | | |
| 3,4-dihydro-2H-pyran | 809 | — | — | — | 20 | — | — | — | — | — | — | — |
| tetrahydro-6-methyl-2H-pyran-2-one | 879 | — | — | — | — | — | — | — | — | — | 8 | — |
| tetrahydro-2H-pyran-2-oil | 884 | 155 | — | — | — | — | — | — | — | — | — | — |
| Thiophenes | | | | | | | | | | | | |
| thiophene | 677 | — | — | — | 179 | — | — | — | — | — | — | — |
| methylthiophene | 778 | — | — | 66 | 63 | 47 | 478 | 62 | — | — | — | — |
| ethylthiophene | 875 | — | — | — | 28 | — | 58 | — | — | — | — | — |
| 2,5 dimethyl thiophene | 897 | — | — | — | 19 | — | 36 | 38 | — | — | — | — |
| thiophenethiol | 995 | — | — | — | 205 | — | — | — | — | — | — | — |
| 2-methyltetrahydrothiophen-3-one | 1014 | 693 | — | 1366 | — | — | — | — | — | 28 | — | — |
| 2-thiophenecarboxaldehyde | 1026 | 20 | — | 99 | — | 104 | — | — | — | — | — | — |
| 2-thiophenemethanoethiol | 1077 | — | — | — | 27 | — | — | — | — | — | — | — |
| 3-(methylthio)thiophene | 1103 | — | — | — | 37 | 145 | — | — | — | — | — | — |
| methylthiophene-carboxaldehyde | 1143 | — | — | 43 | 5 | — | — | 52 | 97 | — | — | — |
| methylthiophene-carboxaldehyde | 1148 | — | — | 526 | 89 | 134 | 41 | 329 | — | — | — | — |
| thienothiophene | 1233 | — | — | 35 | 49 | — | 32 | 16 | 24 | — | — | — |
| thienothiophene | 1276 | — | — | — | 30 | — | — | — | 36 | — | — | — |
| Thiazoles | 734 | — | — | 46 | 51 | — | 1165 | 219 | 870 | — | — | — |
| thiazole | | | | | | | | | | | | |
| methylthiazole | 821 | — | — | — | 62 | 72 | 2 | 71 | 134 | — | 6 | — |
| 5-methylthiazole | 857 | — | — | — | 106 | 57 | 112 | 779 | 82 | — | — | — |
| methylthiazole | 866 | — | — | — | 39 | — | — | — | — | — | — | — |
| dimethylthiazole | 947 | — | — | — | 29 | 88 | 289 | — | 95 | — | — | — |
| 2-ethylthiazole | 959 | — | — | — | 22 | — | 42 | 26 | 78 | — | — | — |
| 2,4,5-trimethylthiazole | 1016 | — | — | — | 1499 | 59 | 262 | — | 153 | — | — | — |
| methylethylthiazole | 1028 | — | — | — | 140 | — | 68 | 123 | 290 | — | — | — |
| 2-acetylthiazole | 1041 | — | — | — | — | 647 | 361 | — | 109 | — | — | — |
| 4-methyl-5-ethenylthiazole | 1043 | 57 | 67 | — | — | — | 59 | 43 | — | — | 20 | — |
| 2-isobutylthiazole | 1065 | 31 | — | — | — | — | — | — | — | — | — | — |
| methylpropylthiazole | 1128 | — | — | — | — | 36 | — | — | — | — | — | — |
| dimethylisopropylthiazole | 1157 | — | — | — | 24 | 29 | 87 | — | 55 | — | — | — |
| dimethylisopropylthiazole | 1152 | — | — | — | — | — | 52 | — | 37 | — | — | — |
| Allphatic compounds | | | | | | | | | | | | |
| 1-propanol | 616 | 65 | — | — | 101 | — | — | — | — | 1319 | — | — |
| 2-butanone | 628 | 1449 | — | — | 2021 | — | 3074 | — | 3755 | — | 1164 | 107 |
| ethylacetate | 631 | — | 144 | 74 | 92 | 112 | — | 97 | 47 | 82 | 110 | 13 |
| 2,3-butanedione | 637 | 1843 | 1092 | 2001 | — | — | — | 1548 | — | 664 | — | — |
| 3-methylbutanal | 655 | 84 | 3297 | 1232 | — | 903 | — | 1213 | 752 | — | — | 1116 |
| pentanal | 686 | 2217 | — | — | — | — | — | — | — | — | — | — |
| 2-methylbutanal | 691 | 621 | 703 | 1277 | — | — | — | 1242 | 151 | — | — | 582 |
| 2-methyl-1-propanol | 705 | 1133 | 2412 | 1238 | 2430 | 1614 | 1997 | 948 | 1791 | 1923 | 3992 | 17 |
| 3-methyl-2-butanone | 672 | — | — | — | 143 | — | 2205 | — | — | 42 | 62 | — |
| 2-pentenal | 698 | — | — | 48 | 22 | — | — | 34 | — | — | — | — |
| 2-pentanone | 708 | 108 | — | 72 | 279 | 93 | 1190 | 85 | 445 | 34 | 91 | — |
| 3-pentanone | 708 | — | — | — | 72 | — | 502 | — | 163 | — | — | — |
| 2,3-pentanedione | 721 | 708 | 487 | 567 | — | 240 | — | 525 | 309 | 66 | — | — |
| 1-butanol | 719 | — | 132 | — | 70 | 100 | — | — | 56 | 28 | 77 | — |
| 1-methoxy-2-propanone | 723 | — | — | — | — | 67 | — | — | 58 | — | — | — |
| 3-hydroxy-2-butanone | 728 | — | — | — | 1327 | 332 | — | 1694 | — | 142 | — | — |
| 2-methyl-2-butenal | 753 | — | 76 | — | — | — | — | — | — | — | — | — |
| 3-methyl-3-buten-1-ol | 761 | 511 | — | 1794 | — | — | 578 | — | — | 98 | 294 | — |
| 3-methylbutanol | 766 | 682 | 2221 | 954 | 730 | 254 | 1278 | 1375 | 564 | 355 | 796 | 94 |

TABLE 13-continued

Volatile compounds analysed by headspace concentration

Approximate quantities (ng/0.4 g of Freeze Dried Centrate, or ng/45.7 g of Centrate

| Identified Compounds | LRI | pH 5.5 140° C. | ph 9 140° C. | pH 5.5 + C 1/20 140° C. | pH 5.5 + C 1/5 140' C. | ph 9 + C 1/20 140° C. | pH 9 + C 1/5 140° C. | pH5.5 + C 1/20 175° C. | pH 9 + C 1/5 175° C. | pH 5.5 + C 1/20 100° C. | pH 5.9 + C 1/5 100° C. | Yeast |
|---|---|---|---|---|---|---|---|---|---|---|---|---|
| 2-butennitrile | 770 | — | — | — | — | — | 249 | — | — | — | — | — |
| heptanol | 770 | 433 | — | — | — | — | — | — | — | — | — | — |
| 4-methyl-2,3,-pentanedione | 801 | 60 | 607 | — | — | — | — | — | — | — | — | — |
| 2,3-hexanedione | 811 | 1686 | 137 | 1791 | — | 434 | — | 1404 | — | 591 | — | — |
| hexanal | 818 | 91 | — | 38 | — | 144 | — | 171 | 57 | — | 13 | 13 |
| 3-hexanone | 822 | 36 | — | 13 | 203 | — | 1654 | — | 244 | — | 58 | — |
| 2-hexanone | 803 | — | — | — | 391 | — | 1502 | — | — | — | 80 | — |
| 3-hydroxy-2-pentanone | 831 | — | — | 75 | 59 | — | — | 125 | — | — | — | — |
| 2-heptanone | 903 | 99 | 122 | 106 | 111 | 113 | 206 | 161 | 83 | 57 | 71 | 7 |
| heptanal | 910 | — | — | — | — | — | — | — | — | — | — | 138 |
| 2-hydroxy-3-hexanone | 913 | 138 | 78 | 323 | 234 | 127 | 65 | 432 | 135 | — | 10 | — |
| 6-methyl-2-heptanone | 967 | 594 | 722 | 9465 | 15413 | 1397 | 4781 | 7347 | — | — | 3512 | — |
| 1,3-cyclopentanedione | 973 | 26 | 24 | — | — | — | — | — | — | — | — | — |
| 5-methyl-2-heptanol | 979 | 31 | 34 | 555 | 684 | 91 | 205 | 572 | 399 | 248 | 247 | — |
| methylheptanone | 984 | — | — | — | 149 | 11 | 234 | — | 2995 | 4909 | 110 | 19 |
| octenol | 988 | — | — | — | — | — | — | — | — | — | 5 | 40 |
| 6-methyl-5-hepten-2-one | 997 | — | — | 114 | 104 | — | — | — | 30 | 25 | 20 | 23 |
| 2-heptenal | 1036 | — | — | — | — | — | — | — | — | — | 15 | 24 |
| 2-nonenal | 1113 | — | — | — | — | — | — | — | 70 | 25 | 7 | 81 |
| 2-octenal | 1069 | — | — | — | — | — | — | — | — | — | — | 25 |
| 1-octanol | 1078 | — | — | — | — | — | — | — | — | — | — | 25 |
| nonanal | 1116 | 37 | — | 56 | — | — | — | 48 | — | — | — | — |
| decanal | 1217 | 28 | — | — | — | — | — | — | — | — | 6 | — |
| 2-undecanone | 1298 | — | — | — | — | — | — | — | — | — | 4 | — |
| butanoic acid butyl ester | 1380 | — | — | — | — | — | — | — | — | — | — | 3 |
| dodecanal | 1417 | — | — | — | — | — | — | — | — | — | — | 3 |
| unsaturated ketone | 1459 | — | — | — | 9 | — | — | — | — | — | — | 8 |
| 1-tetradecanol | 1480 | — | — | — | — | — | — | — | — | — | 11 | — |
| 1-hexadecanol | 1581 | — | — | — | — | — | — | — | — | — | 7 | — |
| Pyrroles/Benzopyrroles | | | | | | | | | | | | |
| pyrrole | 765 | — | — | — | — | 102 | 238 | — | 199 | — | 0 | — |
| 2-meth-1H-pyrrole | 830 | — | — | — | — | — | 12 | — | — | — | — | — |
| tetrahydro-6-methyl-2H-pyran-2-one | 879 | — | — | — | — | — | — | — | — | — | 8 | — |
| 2,4-dimethyl-3-ethyl-1H-pyrrole | 1055 | — | — | — | — | — | — | — | — | — | 22 | — |
| indole | 1313 | — | — | — | — | — | — | — | — | — | 5 | — |
| Phenyls | | | | | | | | | | | | |
| phenol | 727 | — | — | — | 11 | — | — | — | — | — | — | — |
| benzaldehyde | 983 | 223 | 126 | 152 | 60 | 175 | — | 106 | — | — | 17 | 267 |
| methylethylbenzene | 1025 | — | — | — | — | — | — | — | — | — | — | 20 |
| benzenaceataldehyde | 1059 | — | — | — | — | — | — | — | — | — | — | 36 |
| 2-methylphenol | 1065 | — | — | — | — | — | — | — | — | — | — | 5 |
| methylchlorophenol | 1088 | — | — | — | — | — | — | — | — | — | — | 6 |
| acetopheneone | 1080 | — | — | — | — | — | — | — | — | — | 6 | — |
| 2-methylthiophenol | 1157 | — | — | — | — | — | 45 | — | 226 | — | — | — |
| ethoxybenzaldehyde | 1244 | — | — | 228 | 10 | — | — | — | — | — | — | — |
| Pyridines | | | | | | | | | | | | |
| methylpyridine | 833 | — | — | — | — | — | 96 | — | 82 | — | 5 | — |
| 2-methylpyridamine | 848 | 52 | — | — | — | — | — | — | — | — | — | — |
| 6-methyl-4-(1H)-pyrimidinone | 937 | — | — | 253 | 252 | 46 | — | 339 | 190 | 84 | — | — |
| Terpenes | | | | | | | | | | | | |
| 3,6,6-trimethyl-bicyclo-(3.1.1.)hept-2-ene | 934 | — | — | — | — | — | — | — | — | — | — | 8 |
| 1,5-dimethyl-1-5-cyclo-octadiene | 1034 | — | — | — | — | — | — | — | — | — | — | 22 |
| limonene | 1037 | — | — | — | — | — | 41 | — | — | — | 15 | — |
| cymene | 1031 | — | — | — | — | — | — | — | — | — | — | 10 |
| eucalyptol | 1039 | — | — | — | — | — | — | — | — | — | — | 13 |
| verbenene | 1063 | — | — | — | — | — | — | — | — | — | — | 4 |
| 3-7-dimethyl-1,6-octadien-3-Ol | 1105 | — | — | — | — | — | — | — | — | — | — | 19 |
| borneol | 1184 | — | — | — | — | — | — | — | — | — | — | 2 |
| terpin-4-ol | 1191 | — | — | — | — | — | — | — | — | — | — | 15 |
| trimethylbicyclo-(2.2.1)- | 1236 | — | — | — | 38 | — | — | — | — | — | — | 14 |

TABLE 13-continued

Volatile compounds analysed by headspace concentration

Approximate quantities (ng/0.4 g of Freeze Dried Centrate, or ng/45.7 g of Centrate

| Identified Compounds | LRI | pH 5.5 140° C. | ph 9 140° C. | pH 5.5 + C 1/20 140° C. | pH 5.5 + C 1/5 140' C. | ph 9 + C 1/20 140° C. | pH 9 + C 1/5 140° C. | pH5.5 + C 1/20 175° C. | pH 9 + C 1/5 175° C. | pH 5.5 + C 1/20 100° C. | pH 5.9 + C 1/5 100° C. | Yeast |
|---|---|---|---|---|---|---|---|---|---|---|---|---|
| heptan-2-one | 1292 | — | — | — | — | — | — | — | — | — | — | 2 |
| bornyl acetate | 1305 | — | — | — | — | — | — | — | — | — | — | 3 |
| safrole | 1339 | — | — | — | — | — | — | — | — | — | — | 3 |
| terpine | 1383 | — | — | — | — | — | — | — | — | — | — | 5 |
| a sesquiterpene | 1435 | — | — | — | 5 | — | — | — | — | 16 | 12 | 2 |
| a sesquiterpene (cadinene ?) | 1494 | 20 | — | — | 36 | — | 27 | 24 | 15 | — | 14 | 14 |
| a sesquiterpene | 1499 | — | — | — | — | — | 17 | 50 | — | — | 9 | 2 |
| Oxazoles | | | | | | | | | | | | |
| 4,5-dimethyloxazole | 771 | — | — | — | 105 | — | — | — | — | — | — | — |
| trimethyloxazole | 865 | 649 | 540 | 580 | 321 | 174 | 122 | — | 68 | 161 | 29 | — |
| 2,5-dimethyl-ethyloxazole | 932 | 256 | — | — | — | — | — | — | — | 48 | — | — |
| 4,4-dimethyl-2-ethyloxazole | 946 | 10 | — | — | — | — | — | — | — | — | — | — |
| 4,5-dimethyl-2-isopropyloxazole | 986 | 237 | 158 | — | 147 | — | 68 | 160 | 22 | 47 | — | — |
| 4,5-dimethyl-2-propyloxazole | 1014 | — | — | — | — | — | — | 1463 | — | 369 | 65 | — |
| 2,4-dimethyl-5-propyloxazole | 1020 | 697 | — | 1448 | — | — | — | 1555 | — | 513 | — | — |
| 4-methyl-5-ethyl-2-isopropyloxazote | 1044 | — | — | — | 20 | — | — | 48 | — | | | |
| Aliphatic sulfides | | | | | | | | | | | | |
| dimethyldisulfide | 754 | 295 | 389 | 280 | — | 311 | — | — | — | — | — | 81 |
| dimethyltrisulfide | 987 | — | — | 402 | — | 92 | — | — | — | 62 | — | 887 |
| 2-pentanethiol | 841 | — | — | — | 2403 | — | — | 102 | — | — | — | — |
| 1(ethylthio)-2-propanone | 921 | — | — | — | 51 | — | — | — | — | — | — | — |
| 2,2-dithio-bis-ethanol | 1280 | — | — | — | 16 | — | — | — | — | — | — | — |
| Cyclic polysulfides | | | | | | | | | | | | |
| 3,5-dimethyl-1,2,4-trithiolane | 1280 | — | — | — | — | 21 | 91 | — | 36 | — | — | — |
| Dioxanes | | | | | | | | | | | | |
| 4-methyl-1,3-dioxane | 737 | 321 | 46 | 256 | — | — | — | 142 | — | — | — | — |
| TOTAL | | 18678 | 29633 | 28779 | 33228 | 16478 | 32517 | 25890 | 17369 | 11936 | 12195 | 2982 |

The pyrazines, thiazoles and thiophenes content was very much affected by the reaction conditions. The highest levels of pyrazines were found at pH9, as expected, since the formation of N-heterocyclic compounds in the Maillard reaction is favoured by high pH. With a few exceptions, sulphur compounds were formed only in the presence of cysteine, confirming that the content of sulphur amino acids in the freeze dried centrate was very low.

The yeast autolysate aroma volatiles were dominated by terpenes and its composition was very different from the volatiles obtained from the centrate.

Conclusion

The range of flavours was generated from the centrate, showing its potential as a flavouring ingredient or as a source of precursors for reaction product flavourings. The variables that were applied in this study were the centrate concentration, the pH, the presence of added cysteine, and the temperature/duration of the heating conditions. An addition of cysteine was necessary to generate meaty aromas which derive from sulphur-containing volatiles.

We claim:

1. A flavoring material which comprises a reaction product of materials removed as described in (a) or (b) with cysteine:

(a) an aqueous solution which comprises materials removed from filamentous fungus by contacting filamentous fungal cells in their growing state and/or in the presence of its growth medium with water at an elevated temperature sufficient to reduce the nucleic acid content of the filamentous fungal cells in which the concentration of dissolved solids is sufficiently high to render the solution stable to storage at a temperature of 20° C. for a period of one month; or (b) a solid comprising materials so removed from the filamentous fungal cells.

2. A process of producing a flavoring material for food which comprises improving the suitability of filamentous fungus for food by subjecting filamentous fungal cells (a) in their growing state and/or in the presence of its growth medium; and (b) in the presence of water;

to a temperature sufficient to reduce its nucleic acid content thereby producing an aqueous solution and concentrating the aqueous solution, in which materials recovered from the filamentous fungal cells are reacted with a sulphur containing amino acid, hydrogen sulphide or ammonium sulphide thereby producing savory flavors.

3. A process as claimed in claim 2, in which the sulphur containing amino acid is cysteine.

4. A flavoring material which comprises a reaction product of materials removed as described in (a) or (b) with a sulphur containing amino acid, hydrogen sulphide or ammonium sulphide:

(a) an aqueous solution which comprises materials removed from filamentous fungus by contacting filamentous fungal cells in their growing state and/or in the presence of its growth medium with water at an elevated temperature sufficient to reduce the nucleic acid content of the filamentous fungal cells in which the concentration of dissolved solids is sufficiently high to render the solution stable to storage at a temperature of 20° C. for a period of one month; or (b) a solid comprising materials so removed from the filamentous fungal cells.

* * * * *